United States Patent [19]

Ishino et al.

[11] Patent Number: 5,069,087

[45] Date of Patent: Dec. 3, 1991

[54] CLUTCH CHANGEOVER CIRCUIT FOR NON-STAGE TRANSMISSION

[75] Inventors: Tsutomu Ishino, Yawati; Ryoichi Maruyama, Hirakata, both of Japan

[73] Assignee: Kabushiki Kaisha Komatsu Seisakusho, Japan

[21] Appl. No.: 392,537

[22] PCT Filed: Feb. 13, 1989

[86] PCT No.: PCT/JP89/00141

§ 371 Date: Jul. 20, 1989

§ 102(e) Date: Jul. 20, 1989

[87] PCT Pub. No.: WO89/07723

PCT Pub. Date: Aug. 24, 1989

[30] Foreign Application Priority Data

Feb. 19, 1988 [JP] Japan ................................. 63-37051
Feb. 19, 1988 [JP] Japan ................................. 63-37052

[51] Int. Cl.⁵ ............................................. B60K 41/06
[52] U.S. Cl. .................................... 74/867; 475/128
[58] Field of Search ...................... 475/72, 127, 128; 74/867

[56] References Cited

U.S. PATENT DOCUMENTS

| 4,535,681 | 8/1985 | Nakamura et al. | 91/527 |
| 4,831,899 | 5/1989 | Honig | 74/867 |
| 4,934,218 | 6/1990 | Takase et al. | 74/867 |

FOREIGN PATENT DOCUMENTS

| 074163 | 6/1976 | Japan . | |
| 222646 | 12/1984 | Japan . | |
| 222647 | 12/1984 | Japan . | |
| 147845 | 10/1985 | Japan . | |
| 162762 | 11/1985 | Japan . | |
| 2015093 | 7/1978 | United Kingdom | 74/867 |

*Primary Examiner*—Allan D. Herrmann
*Assistant Examiner*—Ryan Massey
*Attorney, Agent, or Firm*—Richards, Medlock & Andrews

[57] ABSTRACT

Disclosed is a clutch changeover circuit suitably used for a multi-stage stationary non-stage transmission. Valve bodies of pressure regulating valve (211, 221, 231, 241) are respectively provided with throttle passages (311, 321, 311, 341) communicating therewith in such a manner that hydraulic oil flows to the clutch sides when they are closed, since the sliding of the clutches or damage thereto can occur if pressure regulating valves having good override characteristics are used. Accordingly, at the time of changing over the clutch, since hydraulic oil flows at least by a portion corresponding to the rate of flow of leaking oil, it is possible to prevent the clutches from sliding or becoming damaged while using regulating valves having good override characteristics. In addition, the circuit is provided with common oil passages (301, 302) leading to a plurality of clutches corresponding to speed stages that are not adjacent to each other, and pressure regulating valves (411, 421) and pressure reducing valves (412, 422) that are used jointly for the plurality of stages are provided in these common oil passages, thereby simplifying the circuit configuration by reducing by half the number of these conventionally employed valves.

6 Claims, 6 Drawing Sheets

1

CLUTCH CHANGEOVER CIRCUIT FOR NON-STAGE TRANSMISSION

BACKGROUND OF THE INVENTION

The present invention relates to a clutch changeover circuit for a non-stage transmission, and more particularly to a clutch changeover circuit suitable for use in a multi-stage type stationary hydraulic mechanical non-stage transmission.

As a multi-stage type stationary hydraulic mechanical non-stage transmission, the one having the arrangement shown in FIG. 1 is generally known. In this transmission, an input shaft 1 and an output shaft 2 are connected to each other via the following: a planetary gear P1 for accelerating the mechanical input of the second speed, a synthetic planetary gear P2 for a mechanical drive system and a hydraulic drive system for the second and fourth speeds, and a synthetic planetary gear P3 for a mechanical drive system and a hydraulic drive system for the first, second, third, and fourth speeds. A variable-discharge-capacity pump 3 driven via gears 5, 6, 7 as well as a volume-fixing motor 4 driven by this pump 3 are connected to the input shaft 1. The output of the pump 3 is transmitted to a sun gear 52 of the synthetic planetary gear P2 via gears 8, 9, 10 and to a sun gear 53 of the synthetic planetary gear P3 via gears 8, 9, 11, 12. These gears are provided with clutches for changing over the speed stage. Specifically, a clutch C1 for the first speed is provided for connecting or disconnecting the rotation of a ring gear R3 of the synthetic planetary gear P3 on the output shaft 2 side, and a clutch C2 for the second speed is provided for connecting or disconnecting the rotation of a ring gear R1 of the planetary gear P1 on the input shaft 1 side. Furthermore, a clutch C3 for the third speed for connecting or disconnecting the transmitted rotation from the input shaft 1 is provided on a shaft member 13 which connects together the ring gears of the synthetic planetary gear P2 and the synthetic planetary gear P3, while a clutch C4 for the fourth speed for connecting or disconnecting the transmitted rotation from the input shaft 1 is provided on an arm 14 which connects together the planetary gears of the planetary gear P1 and the synthetic planetary gear P2.

In such a transmission, since a speed change is effected at a point where there is no difference in the relative speed with respect to the following-stage clutch, it is possible to change the speed-change stage in which there is no shock which is caused by the changeover of the clutch.

In addition, the speed change is always effected in the order of the respective adjacent speed stages and is not effected by jumping a midway speed stage.

A hydraulic circuit such as the one shown in FIG. 2 (Japanese Utility Model Application No. 151193/1984) is used to effect a changeover among the clutches C1, C2, C3, and C4 with respect to the above-described transmission. This circuit is so arranged that oil circuits for the respective clutches C1, C2, C3, and C4 are provided to a hydraulic pump 101 in parallel, and pressure regulating valves 111, 121, 131, 141, reducing valves 112, 122, 132, 142, and clutch changeover valves 113, 123, 133, 143 are disposed in these oil passages in the order mentioned from the upstream side, the clutch changeover valves being respectively opened and closed by solenoid valves 114, 124, 134, 144. Hydraulic pressure from the hydraulic pump 101 acts on each of the solenoid valves via a reducing valve 102 serving as a pilot valve, the clutch changeover valve is actuated upon activation of the solenoid valve, and a corresponding clutch is adapted to operate. Hydraulic oil from the hydraulic pump 101 is returned to the tank 100 via a pressure regulating valve 103.

In accordance with such a hydraulic circuit, since the pressure regulating valves 111, 121, 131, 141 are provided in the oil circuits leading to the respective clutches C1, C2, C3, C4, it is possible to prevent the pressure of the presently engaged clutch from falling, until a following-stage clutch is engaged during a speed change. Hence, it is possible to obtain an advantage in that the clutch engaging period can be minimized with respect to the flow rate of the hydraulic pump. Accordingly, when an attempt is made to engage the clutch C2 from the state in which the clutch C1 is engaged, if the oil passage to the clutch C2 is opened, the pressure regulating valve 103 placed in a supply oil passage 200 from the hydraulic pump 101 is closed due to a drop in the circuit pressure. However, since the pressure regulating valve 121 is actuated, the pressure within the supply oil passage 200 is maintained above a set pressure of the regulating valve 121, so that the pressure of the clutch C1 is maintained at a set pressure of the regulating valve 121.

However, with the conventional clutch changeover circuit, although the pressure within the supply oil passage 200 is maintained above a set pressure of the regulating valve concerned, there has been a drawback which stems from the fact that the override characteristics of the regulating valves are good. For instance, when an attempt is made to effect a changeover operation between, for instance, the clutches C1 and C2, it is assumed that, as shown in FIG. 3, the pressure gradients of the regulating valves 111, 121, and the regulating valve 103 disposed in the supply oil passage 200 are small with respect to a flow rate Q of the pump, and that the set pressures P111, P121 of the clutch-side regulating valves 11, 121 fluctuate vertically, as illustrated in the drawing, due to production errors or the like (P111>P121). If the clutch C2 is operated in such a state, even if oil flows from the hydraulic pump 101 at a full flow rate $Q_A$, the supply pressure rises only up to the full bore hydraulic pressure $P_B$ of the regulating valve 121, so that the pressure does not reach the set pressure of the C1 clutch-side regulating valve 111. In such a case, the hydraulic oil does not flow to the clutch C1, and since leakage usually occurs downstream of the regulating valve, the pressure fails to rise, and the pressure of this clutch hence declines. Consequently, there has been a problem in that this can result in the sliding of the clutch, ultimately resulting in the possible damage to the clutch. For this reason, it has conventionally been necessary to positively use regulating valves having poor override characteristics, as shown in FIG. 4. In this case, since the pressure gradients with respect to the flow-rate Q of the pump are large, the characteristic line of the full bore hydraulic pressure $P_B$ on the side of the clutch to which a changeover is to be effected intersects the characteristic line of the set pressure P111 of the regulating valve on the side of the already operating clutch ($P_B$>P111) As a result, the line pressure acts on the already operating clutch, so that no damage to the clutch results even if the oil may leak.

Thus, it has hitherto been impossible to use regulating valves having good override characteristics, and there has been the drawback that regulating valves having poor override characteristics have to be used positively, which has been a large disadvantage. In addition, in correspondence with the poor override characteristics, it has been necessary to set the pressure of the regulating valve 103 provided in the supply oil passage 200 at a high level, which disadvantageously necessitates the capacity of the hydraulic pump 101 to be increased.

Furthermore, with the conventional clutch changeover circuit, it has been necessary to provide pressure regulating valves separately in oil passages leading to the clutches. This has brought about the problem of the circuit configuration becoming complicated and the valve mechanisms incorporated in this circuit becoming large in size.

SUMMARY OF THE INVENTION

Accordingly, an object of the present invention is to provide a clutch changeover circuit for a non-stage transmission having a structure that allows valve mechanisms to be simplified, thereby overcoming the above-described drawbacks.

To this end, in accordance with the present invention, there is provided a clutch changeover circuit for a non-stage transmission, specifically, a multi-stage type stationary mechanical non-stage transmission, in which at least pressure regulating valves are provided in oil passages leading from a pump to respective clutches, the clutch changeover circuit comprising: throttle passages each provided at the valve-closing position of each of the pressure regulating valves in such a manner as to communicate with each of the pressure regulating valves.

By virtue of the above-described arrangement, at the time of changing over the clutch, even if the full, bore hydraulic pressure of the regulating valve after a changeover is smaller than the set pressure of the regulating valve before the changeover, and this regulating valve is closed, this regulating valve is provided with a low passage. The arrangement is such that hydraulic oil flows to the clutch side at least by the rate of flow of leaking oil, with the result that the line pressure acts on the clutch, thereby preventing the clutch from sliding or becoming damaged. Accordingly, it is possible to use regulating valves having excellent override characteristics.

In addition, in accordance with another aspect of the invention, there is provided a clutch changeover circuit for a non-stage transmission, specifically, a multi-stage type stationary mechanical non-stage transmission, in which at least pressure regulating valves are provided in oil passages leading from a pump to respective clutches, the clutch changeover circuit comprising: a common oil passage for a plurality of clutches provided in correspondence with speed stages that are not adjacent to each other, the pressure regulating valve being provided in the common oil passage so as to be used jointly for the plurality of speed stages.

Because of this arrangement, since a regulating valve is used jointly for clutches of speed stages that, are not adjacent to each other and different regulating valves correspond to adjacent clutches, a drop in the pressure of the presently engaged clutch is prevented from falling by a corresponding regulating valve until it is engaged with a following-stage clutch during a speed change. Accordingly, it is possible to reduce the number of regulating valves while maintaining the effect of installation of the regulating valves, thereby making the structure compact.

Furthermore, in accordance with still another aspect of the invention, there is provided a clutch changeover circuit for a non-stage transmission in which a reducing valve is provided following the regulating valve, the reducing valve being provided in the common oil passage so as to be used jointly for the plurality of speed stages.

By virtue of this arrangement, it is possible to reduce the number of the reducing valves, thereby making it possible to make the structure more compact.

DESCRIPTION OF THE PREFERRED EMBODIMENTS

Figure 5:
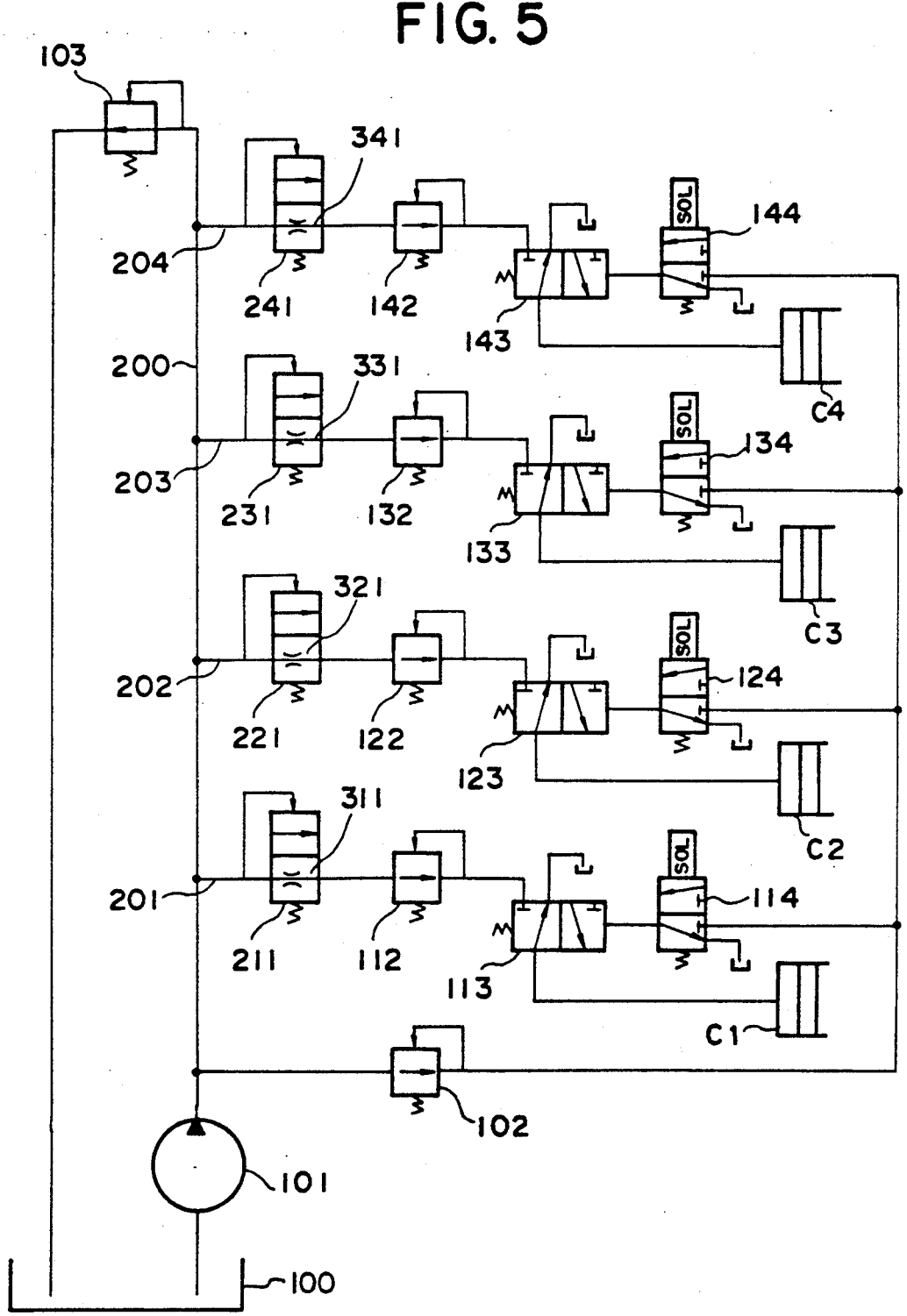
FIG. 5 is a diagram schematically illustrating the configuration of a clutch changeover circuit for a non-stage transmission in accordance with a first embodiment of the present invention.

FIG. 5 is a schematic diagram of a clutch changeover circuit for a non-stage transmission in accordance with a first embodiment of the present invention. This hydraulic circuit is used for the non-stage transmission shown in FIG. 1. This circuit is arranged such that, as shown in FIG. 5, oil passages 201, 202, 203, 204 leading from a hydraulic pump 101 to respective clutches C1, C2, C3, C4 are connected to a supply oil passage 200 in such a manner as to be parallel with each other so as to cause hydraulic pressure to act on the respective clutches C1, C2, C3, C4. Pressure regulating valves 211, 221, 231, 241 are provided in the oil passages 201, 202, 203, 204 leading to the clutches C1, C2, C3, C4 on the uppermost-stream sides thereof. Throttle passages 311, 321, 331, 341, communicating in such a manner that hydraulic oil flows to the clutches particularly when the valves are closed, are respectively formed in these regulating valves. These throttle passages 311, 321, 331, 341 suffice if they are capable of allowing the oil to flow by a portion compensating for the amount of leakage from component members on the downstream sides of the regulating valves 211, 221, 231, 241, and these throttle passages can be provided simply by being formed on the valve bodies of the respective regulating valves.

It should be noted that, in the same way as the conventional arrangement, the clutches C1, C2, C3, C4 are connected to the downstream sides of the regulating valves 211, 221, 231, 241 via the clutch changeover valves 113, 123, 133, 143, and the clutch changeover operations are conducted by means of solenoid valves 114, 124, 134, 144.

In accordance with this first embodiment, at the time of changing over the clutch, the hydraulic pressure of the supply oil passage 200 is transmitted to the clutches C1 C2, C3, C4 already in operation via the throttle passages 311, 321, 331, 341 of the corresponding regulating valves 211, 221, 231, 241. When the following-stage clutch is operated at the time of a speed change, even if the full bore hydraulic pressure of the corresponding regulating valve 211, 221, 231, or 241 is lower than the set pressure of the preceding-stage clutch, it is possible to prevent the sliding of the clutch. Accordingly, the drawback caused by the good characteristics of the regulating valves 211, 221, 231, 241 can be overcome substantially. In addition, the set pressure of the regulating valve provided in the supply oil passage 200 can be set to a low level, and the horsepower consumption by the hydraulic pump 101 can be reduced. As a result, it is possible to obtain a clutch changeover circuit for a non-stage transmission having small power losses.

Figure 1:
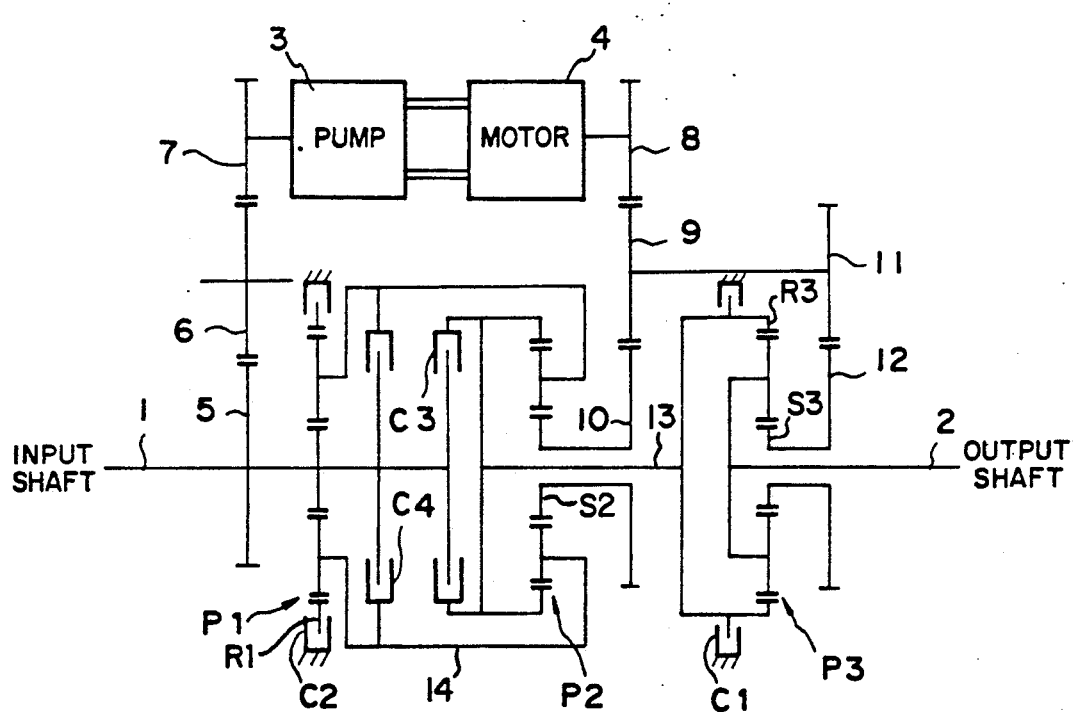
FIG. 1 is a diagram schematically illustrating the configuration of a multi-stage type stationary hydraulic mechanical non-stage transmission.
Figure 2:
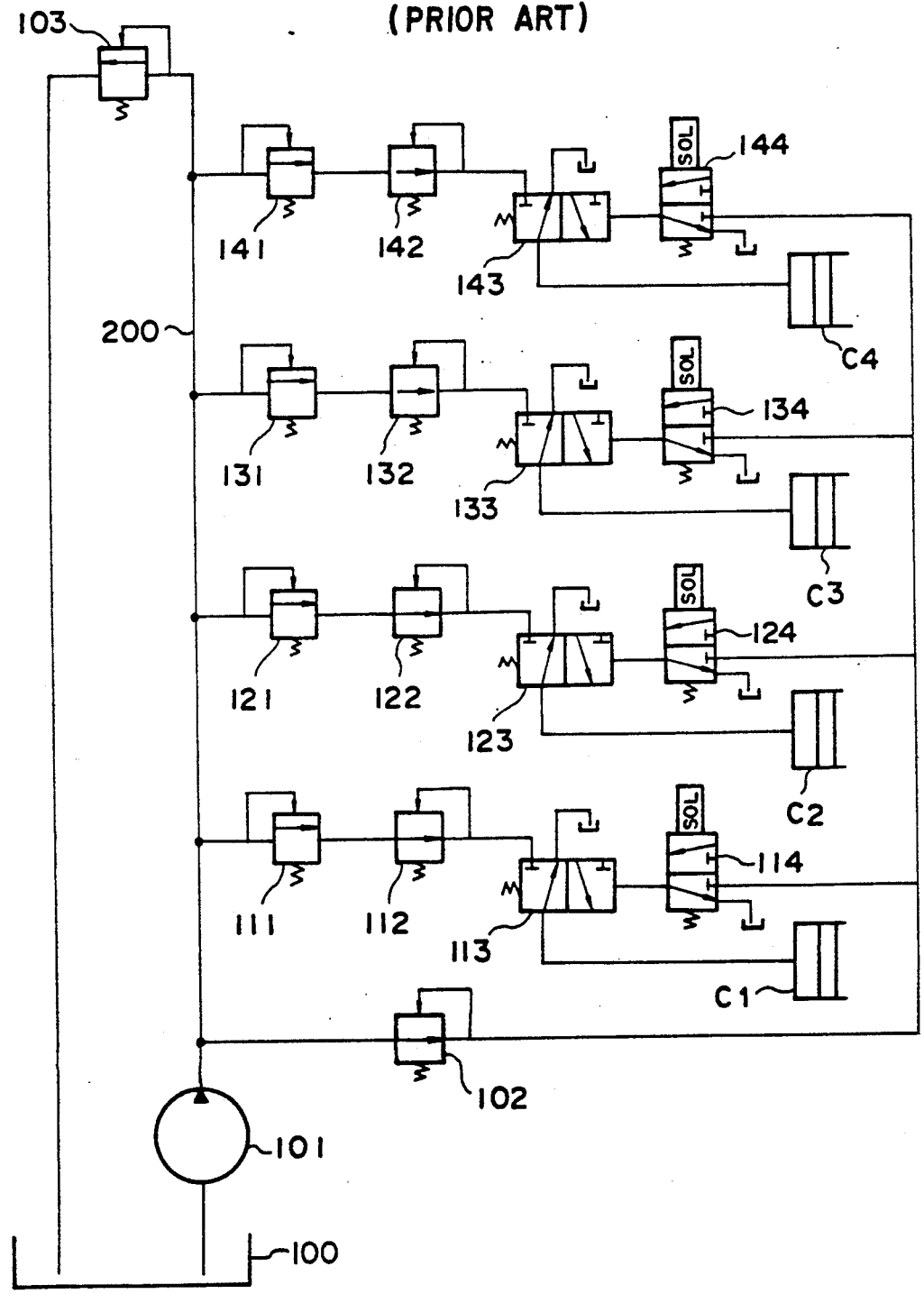
FIG. 2 is a diagram schematically illustrating the configuration of a conventional clutch changeover circuit for a non-stage transmission.
Figure 3:
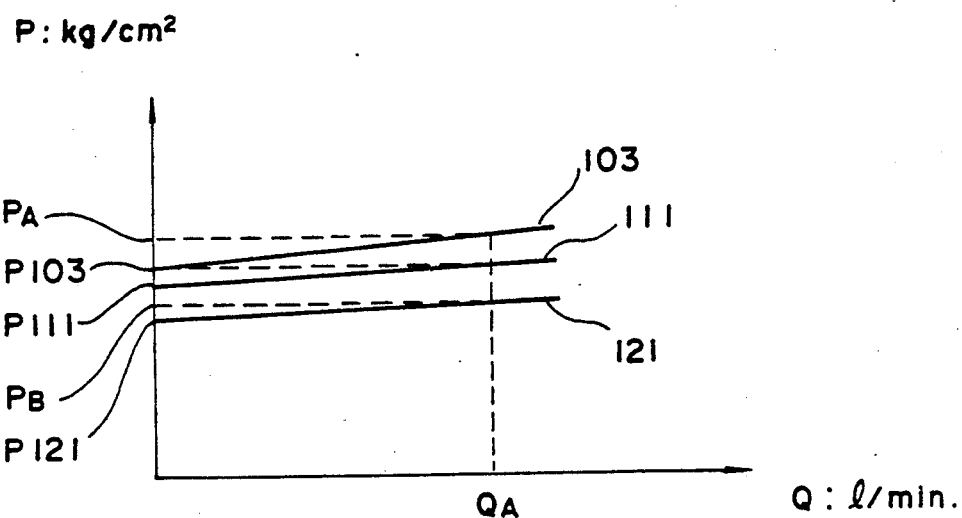
FIGS. 3 and 4 are diagrams respectively illustrating a case in which the override characteristics of regulating valves are good and a case in which they are poor.
Figure 4:
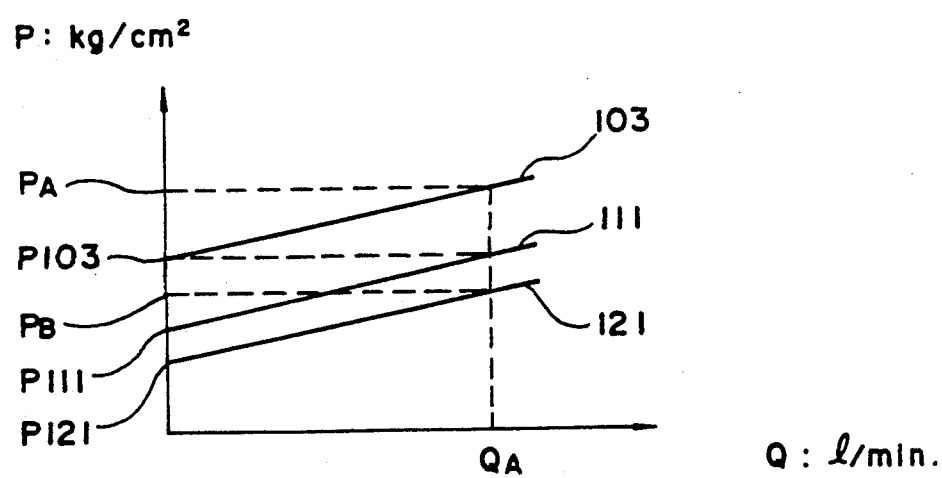
Figure 6:
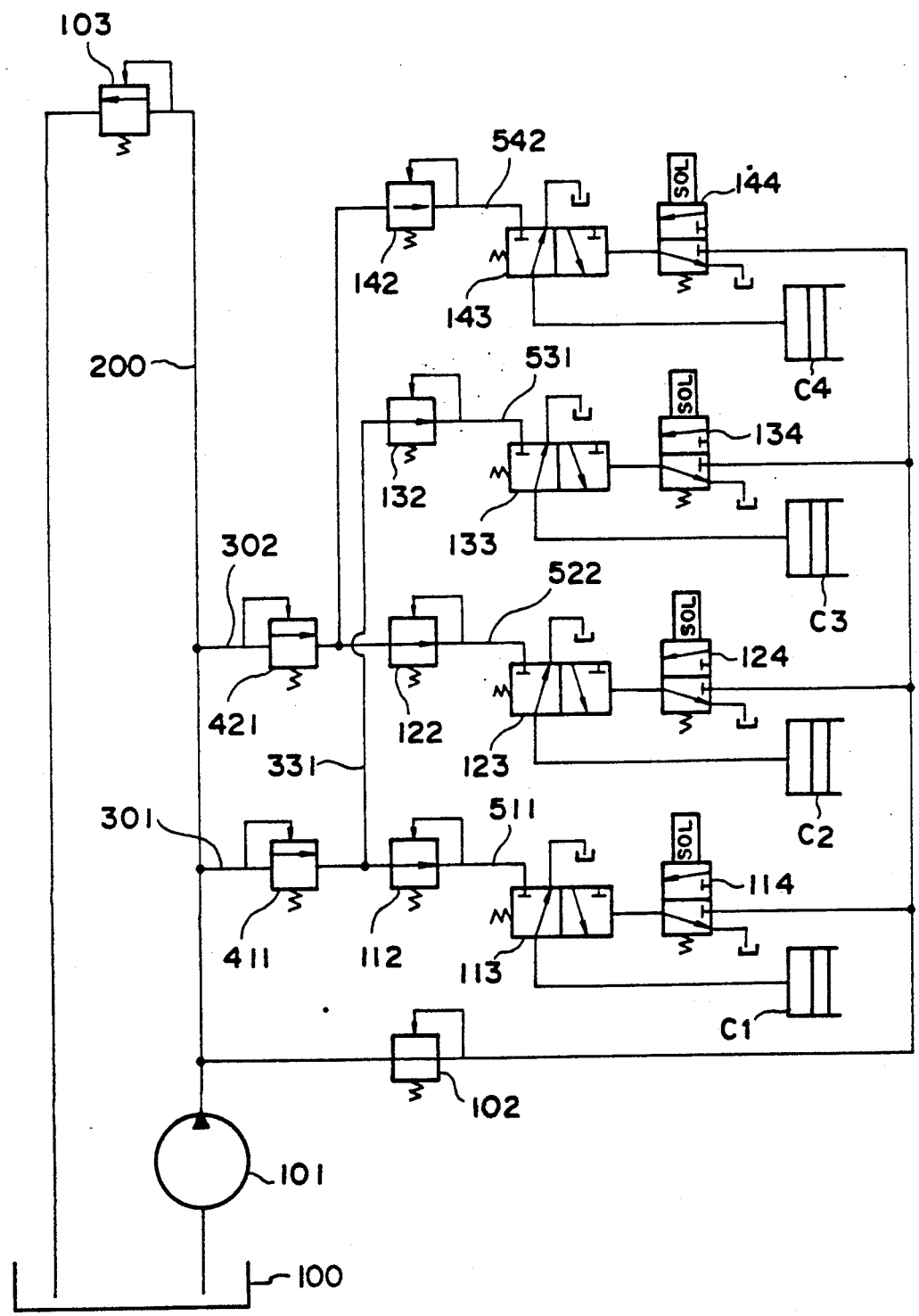
FIG. 6 is a diagram schematically illustrating the configuration of the circuit in accordance with a second embodiment of the present invention.

FIG. 6 is a schematic diagram of a clutch changeover circuit for a non-stage transmission in accordance with a second embodiment of the present invention, and this hydraulic circuit is used for the non-stage transmission shown in FIG. 1. This circuit is provided with oil passages leading from the hydraulic pump 101 to the respective clutches C1, C2, C3, C4, as shown in FIG. 6, and these oil passes comprise a common oil passage 301 for the clutches C1, C3 for the first and third speeds and a common oil passage 302 for the clutches C2, C4 for the second and fourth speeds. A pressure regulating valve 411 used jointly by the clutches C1, C3 for the first and third speeds is interposed in one common oil passage 301, while a regulating valve 421 jointly used by the clutches C2, C4 for the second and fourth speeds is interposed in the other common oil passage 302. Output-side oil passages for these regulating valves 411, 421 are respectively branched. Specifically, the common oil passage 301 for the regulating valve 411 is branched into a first oil passage 511 leading to the clutch C1 for the first speed and a third oil passage 531 leading to the clutch C3 for the third speed, while the common oil passage 302 for the regulating valve 421 is branched into a second oil passage 522 leading to the clutch C2 for the second speed and a fourth oil passage 542 leading to the clutch C4 for the fourth speed. The branch oil passages 511, 522, 531, 542 are respectively provided with reducing valves 112, 122, 132, 142 and changeover valves 113, 123, 133, 143. These changeover valves 113, 123, 133, 143 are respectively actuated by the operation of the solenoid valves 114, 124, 134, 144 using the hydraulic pressure supplied from the hydraulic pump 101 via the pressure reducing valve 102. The set pressure of the regulating valve 411 is above the greater one of the set pressures of the reducing valves 122, 142, while the set pressure of the reducing valve 421 is above the greater one of the set pressures of the reducing valves 112, 132. In addition, the set pressure of the reducing valve 103 is greater than both of the set pressures of the regulating valves 411, 421.

In accordance with this second embodiment, when the clutch C1 for the first speed is operating, the hydraulic oil is transmitted from the hydraulic pump 101 to the clutch C1 via the supply oil passage 200, the common oil passage 301, the regulating valve 411, the reducing valve 112, the branch oil passage 511, and the changeover valve 113. The pressure determined by the reducing valve 112 acts on the clutch C1, while the pressure within the common oil passages 301, 302 and the oil supply passage 200 is maintained at a level determined by the regulating valve 103. Then, when a changeover is effected to the second speed, the oil passage for the clutch C2 for the second speed is opened, and, even if the pressure within the supply oil passage 200 falls below the set pressure of the regulating valve 103, the pressure within the supply oil passage 200 from the hydraulic pump 101 is maintained at a set pressure by the regulating valve 421, while the pressure of the clutch C1 is maintained at the set pressure of the reducing valve 112. Since such speed-change operations are effected between continued adjacent-stage clutches, even if the regulating valves designed for adjusting pressure of non-adjacent clutches are used jointly, it becomes possible for these regulating valves to allow the pressure of a presently engaged clutch not to drop until it is engaged with the following-stage clutch.

In other words, in the second embodiment, by making effective use of the fact that the stationary hydraulic type mechanical non-stage transmission, required to effect a changeover to an adjacent speed stage without fail, cannot effect a speed change by jumping the adjacent speed stage, it is possible to reduce by half the number of regulating valves used for preventing a decline in the preceding-stage clutch pressure.

Figure 7:
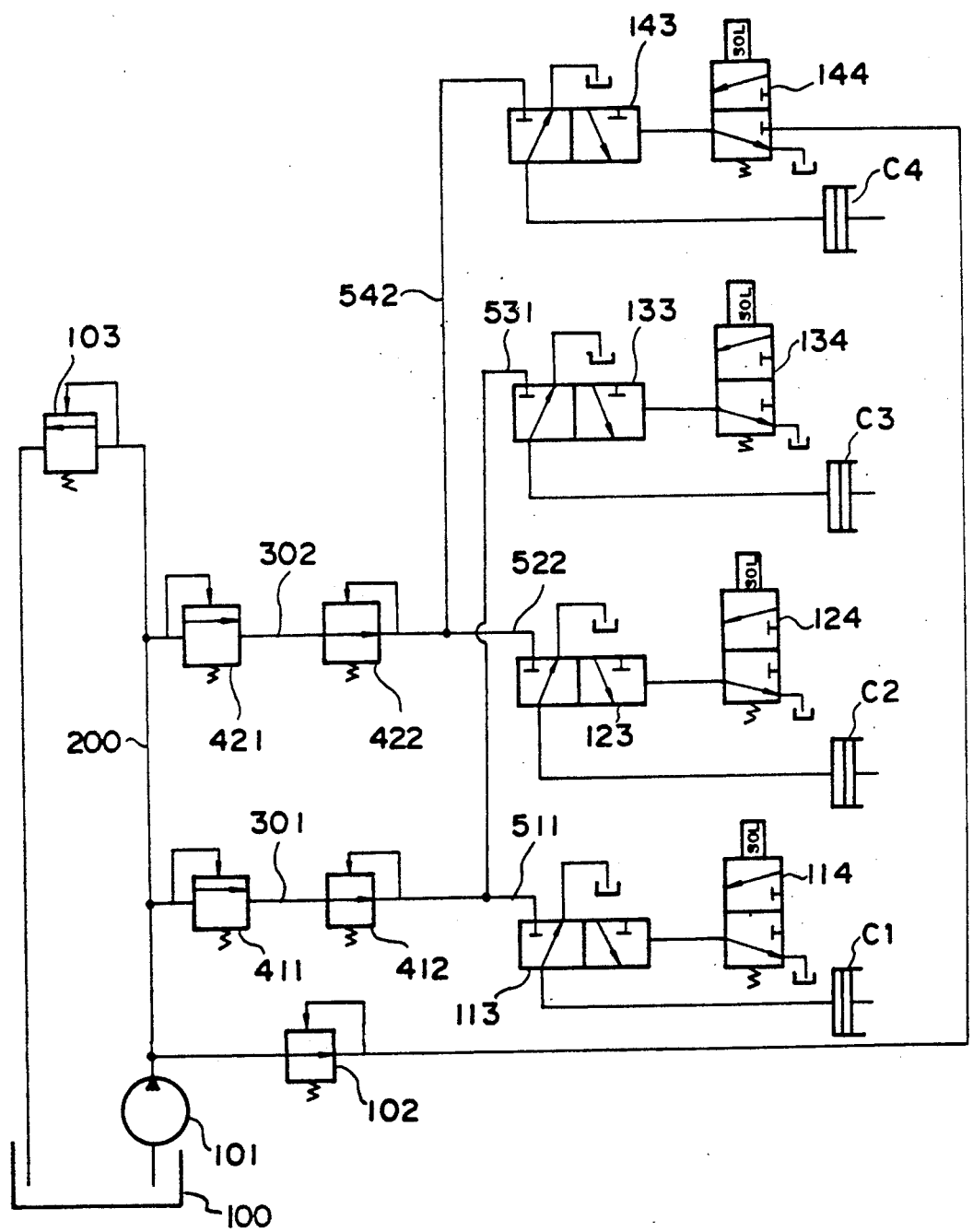
FIG. 7 is a diagram schematically illustrating the circuit in accordance with a third embodiment of the present invention.

FIG. 7 is a schematic diagram of a clutch changeover circuit for a non-stage transmission in accordance with a third embodiment of the present invention. Although only the regulating valves are used jointly in the above-described second embodiment, the third embodiment differs from the second embodiment in that the reducing valves following the regulating valves are also used jointly. Consequently, the arrangement is such that the regulating valves 411, 421 and the reducing valves 412, 422 are provided in series in the common oil passages 301, 302, and the common oil passages 301, 302 are branched on the downstream sides of the these reducing valves 412, 422. In this case, it goes without saying that the set pressures of the reducing valves that are used jointly are required to be equal. Since the other arrangements are identical with those of the second embodiment, a description thereof will be omitted.

In accordance with this third embodiment, the number of the reducing valves can also be reduced by half, thereby further simplifying the valve mechanisms.

As described above, the clutch changeover circuit for a non-stage transmission in accordance with the present invention is useful as a circuit having small power losses since it is capable of preventing the clutch from sliding or becoming damaged while using regulating valves having good override characteristics. In addition, since the number of regulating valves can be reduced while preventing a decline in the preceding-stage clutch at the time of a clutch changeover, and since the number of the reducing valves can also be decreased, this clutch changeover circuit is suitable for a circuit in which the adoption of simplified valve mechanisms is preferable.

It should be noted that the present invention is not restricted to the illustrated embodiments described above, and various modifications and alterations are possible by combining, for instance, the first embodiment and the second or third embodiment, within the scope of the appended claims.

What is claimed is:
1. A clutch changeover circuit for a multi-stage type stationary mechanical non-stage transmission, in which at least pressure regulating valves are provided in oil passages leading from a pump to respective clutches, said clutch changeover circuit comprising:

throttle passages each provided at the valve-closing position of each of said pressure regulating valves in such a manner as to communicate with each of said pressure regulating valves.

2. In a clutch changeover circuit for a non-stage transmission having an input shaft, an output shaft, a plurality of hydraulically actuated clutches for connecting or disconnecting associated mechanical gears for changing the relationship of the rotation of said output shaft to the rotation of said input shaft, a hydraulic pump having an output, a hydraulic fluid supply conduit connected to the output of said pump, a plurality of hydraulic lines, each of said hydraulic lines being connected between said hydraulic fluid supply conduit and a respective one of said plurality of hydraulically actuated clutches, each of said hydraulic lines having a pressure regulating valve operatively positioned therein which is actuated responsive to the hydraulic fluid pressure in the respective hydraulic line upstream of the respective pressure regulating valve, the improvement comprising each of said pressure regulating valves being provided with a throttle passage at the valve-closing position to permit hydraulic fluid to flow from the hydraulic fluid supply conduit through the respective throttle passage to the clutch side of the respective passage regulating valve when the respective pressure regulating valve is closed.

3. A clutch changeover circuit for a non-stage transmission in accordance with claim 2, further comprising a hydraulic fluid reservoir, a main pressure regulating valve connected between said hydraulic fluid supply conduit and said hydraulic fluid reservoir, said main pressure regulating valve being actuated responsive to the fluid pressure in said hydraulic fluid supply conduit.

4. A clutch changeover circuit for a non-stage transmission in accordance with claim 3, further comprising a plurality of reducing valves, each of said reducing valves being located in a respective one of said plurality of hydraulic lines between the respective pressure regulating valve positioned therein and the respective one of said plurality of hydraulically actuated clutches.

5. A clutch changeover circuit for a non-stage transmission in accordance with claim 4, further comprising a plurality of clutch changeover valves, each of said plurality of clutch changeover valves being located in a respective one of said plurality of hydraulic lines between the respective reducing valve positioned therein and the respective one of said plurality of hydraulically actuated clutches.

6. A clutch changeover circuit for a non-stage transmission in accordance with claim 5, further comprising a plurality of solenoid valves, each of said plurality of solenoid valves being associated with a respective one of said plurality of clutch changeover valves such that a clutch changeover valve is actuated by the activation of the associated solenoid valve.

* * * * *

UNITED STATES PATENT AND TRADEMARK OFFICE
CERTIFICATE OF CORRECTION

PATENT NO.   : 5,069,087
DATED        : December 3, 1991
INVENTOR(S)  : Tsutomu Ishino and Ryoichi Maruyama It is certified that error appears in the above-identified patent and that said Letters Patent is hereby corrected as shown below:

Column 7, line 29, change "passage" to --pressure--.

Signed and Sealed this

Twenty-eighth Day of December, 1993

Attest:

BRUCE LEHMAN

*Attesting Officer*   *Commissioner of Patents and Trademarks*